Feb. 22, 1966  A. L. WELLFORD  3,237,124
SELF-OSCILLATING GATE CONTROLLED RECTIFIER INVERTER
Filed Aug. 25, 1961
2 Sheets-Sheet 1

INVENTOR.
ARMISTEAD L. WELLFORD
BY Isidore Match
ATTORNEY

Feb. 22, 1966 A. L. WELLFORD 3,237,124
SELF-OSCILLATING GATE CONTROLLED RECTIFIER INVERTER
Filed Aug. 25, 1961 2 Sheets-Sheet 2

INVENTOR.
ARMISTEAD L. WELLFORD
BY
Isidore Match
ATTORNEY

United States Patent Office 3,237,124
Patented Feb. 22, 1966

3,237,124
SELF-OSCILLATING GATE CONTROLLED
RECTIFIER INVERTER
Armistead L. Wellford, Waynesboro, Va., assignor to
General Electric Company, a corporation of New York
Filed Aug. 25, 1961, Ser. No. 133,997
14 Claims. (Cl. 331—113)

This invention relates to static inverters. More particularly, it relates to an arrangement for converting a D.C. power input to an A.C. power output without without the need for an external A.C. voltage gating source.

Heretofore, static inverters employing as switching elements therein silicon controlled rectifiers, thyratrons and the like have required an external A.C. voltage gating source for their operation. Such external source is expensive in that it generally has to be a bistable device employing active elements such as vacuum tubes or transistors. It is particularly expensive in situations where high ambient temperatures are encountered since in the latter situations, expensive active devices such as silicon transistors have to be utilized. Also, such external gating source generally includes an output transformer which may be of the saturable type and therefore may also present an added expense in addition to an added weight and space problem.

Accordingly, it is an important object of this invention to provide a self-oscillating static inverter which does not require an external A.C. voltage gating source for its operation.

It is another object of the invention to provide a self-oscillating inverter in accordance with the preceding object and employing silicon controlled rectifiers wherein the length of the gating signals for the controlled rectifiers produced by self-oscillation is a full half cycle whereby unitentional extinguishing of the controlled rectifiers due to lagging power factor loads are insured against.

Generally speaking and in accordance with the invention there is provided an inverter circuit comprising a pair of gate controlled rectifiers, each being connected in parallel circuit arrangement across a source of direct current electric power and including an anode, a cathode, and a gate electrode, a commutating capacitor being connected across the gate controlled rectifiers. There are included means in circuit with both of the gate electrodes for developing a chosen potential therebetween. There are further provided a saturable device and means for applying the potential at the gate electrode of the conducting gate controlled rectifier to the gate electrode of the other and nonconducting gate controlled rectifier through the saturable device in one path, such path being in the saturating direction, the saturation of the saturable device causing the potential at the gate electrode of the conducting gate controlled rectifier to be rapidly transferred to the gate electrode of the non-conducting gate controlled rectifier whereby the latter gate controlled rectifier is rendered conductive and the conducting gate controlled rectifier is commutated into nonconductivity.

The features of this invention, which are believed to be new, are set forth with particularity in the appended claims. The invention itself, however, may best be understood by reference to the following descripton when taken in conjunction with the accompanying drawings which show embodiments of a self-oscillating inverter according to the invention.

Figure 1:
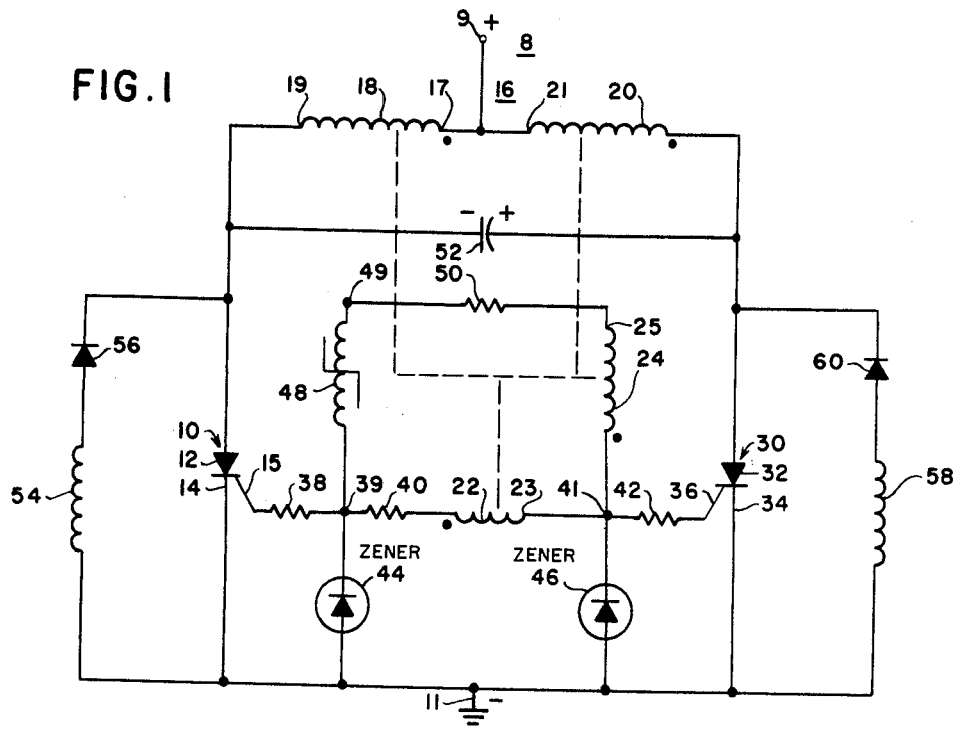
FIG. 1 is a schematic diagram of a self-oscillating inverter embodying a saturable reactor as the volt device therein.

Referring now to FIG. 1, the anode 12 of a silicon controlled rectifier 10 is connected to the positive terminal 9 of a D.C. power source 8 through the primary winding 18 of an output transformer 16, the cathode 14 of silicon controlled rectifier 10 being connected to the negative terminal 11 of the power source, i.e., ground. Similarly, the anode 32 of a silicon controlled rectifier 30 is connected to positive terminal 9 through a primary winding 20 of output transformer 16, the cathode 34 of silicon controlled rectifier 30 also being connected to ground. Connected between gate electrodes 15 and 36 of silicon controlled rectifiers 10 and 30 respectively is a series arrangement of a resistor 38, a resistor 40, a secondary winding 22 of transformer 16 and a resistor 42, the junction 39 of resistors 38 and 40 being connected to ground through the cathode to anode path of a reference diode 44, diode 44 suitably being a Zener diode.

The junction 41 of secondary winding 22 and resistor 42 is also connected to ground through the cathode to anode path of a Zener reference diode 46.

Connected between junctions 39 and 41 is the series arrangement of a saturable reactor 48, a resistor 50 and a secondary winding 24 of transformer 16. A capacitor 52 is provided connected between the anodes 12 and 32 of silicon controlled rectifiers 10 and 30 respectively. A series arrangement of an inductor 54 and the anode to cathode path of a diode 56 is connected between cathode 14 and anode 12 of silicon controlled rectifier 10 and a series arrangement of an inductor 58 and the anode to cathode path of a diode 60 is connected between cathode 34 and anode 32 of silicon controlled rectifier 30.

Figure 2:
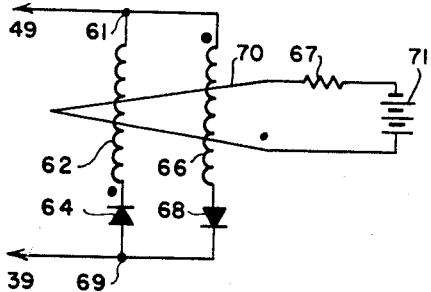
FIG. 2 is a schematic drawing of a self-saturating magnetic amplifier, i.e., an "amplistat" which may be utilized as the volt-second device in the circuit of FIG. 1 in place of the saturable reactor.

In FIG. 2, there is shown a self-saturating magnetic amplifier, i.e., an "amplistat" which may be utilized as the volt-second device in the circuit of FIG. 1 in place of saturable reactor 48. The magnetic amplifier of FIG. 2 comprises a parallel arrangement of a series combination of a gate winding 62 in circuit with the cathode to anode path of a diode 64 and a series combination of a gate winding 66 and the anode to cathode path of a diode 68. Gate windings 62 and 66 are wound on separate cores. A control winding 70 of the magnetic amplifier in circuit with a resistor 67 and a D.C. source 71 is wound around both cores.

When the magnetic amplifier of FIG. 2 is substituted for saturable reactor 48 of FIG. 1, junction 61 of windings 62 and 66 is connected to junction 49 and the junction 69 of the anode of the diode 64 and the cathode of diode 68 is connected to junction 39.

Figure 3:
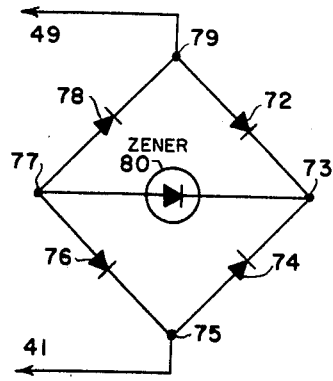
FIG. 3 is a schematic depiction of an arrangement for clamping the voltage applied to the volt-second device of the inverter of FIGS. 1 and 2 to obtain constant frequency output therefrom.

In FIG. 3, there is chosen an A.C. voltage clamp comprising diodes 72, 74, 76 and 78, the junction 73 of the cathodes of diodes 72 and 74 being connected to the junction 77 of the anodes of diodes 76 and 78 through the cathode to anode path of a reference Zener diode 80. The A.C. voltage clamp of FIG. 3 may be utilized in the circuit in FIG. 1 by connecting junction 79 of the cathode of diode 78 and the anode of diode 72 to junction 49 and by connecting the junction 75 of the cathode of diode 76 and the anode of diode 74 to junction 41 whereby the voltage applied to the volt-second device is maintained at a constant level and whereby constant frequency output is thereby provided from the inverter circuit.

The operation of the inverter of FIG. 1 is first explained with regard to the functioning of that portion comprising primary windings 18 and 20 of output transformer 16, silicon controlled rectifiers 10 and 30, capacitor 52, inductors 54 and 58 and diodes 56 and 60.

In this latter connection, let it be assumed that a positive gating current pulse is applied to gate electrode 15 of silicon controlled rectifier 10 from an external square wave voltage source. As a consequence thereof, silicon controlled rectifier 10 is rendered conductive and essentially the voltage of D.C. power source 8 appears across primary winding 18. Due to autotransformer action, i.e., transformer action between primary windings 18 and 20, capacitor 52 charges to a voltage substantially equal to twice the voltage of source 8 at a rapid rate, the polarity of capacitor 52 being as shown. Such situation persists with a duration of a half cycle of the voltage from the external source at which time the next half cycle in the inverter is initiated by the gating into conduction of silicon controlled rectifier 30 from the other half cycle of output from the external source. With the initiating of such second half cycle, i.e., when a positive voltage pulse appears at gate electrode 36 of silicon controlled rectifier 30, capacitor 52 is essentially connected across silicon controlled rectifier 10 in the reverse polarity thereby quickly causing silicon controlled rectifier 10 to cease conducting and to recover its blocking state. Capacitor 52 now becomes charged to twice the voltage of source 8 in the reverse polarity at a rate which is determined partly by the load current flowing and partly by the series resonant combination of inductors 54 and 58 and capacitor 52 and conduction now continues in silicon controlled rectifier 30. When silicon controlled rectifier 10 and 30 respectively conduct, half cycles of outputs are taken from transformer 16 on other secondary windings (not shown). Diodes 56 and 60 are included to permit the return of energy to source 8 under conditions such as those of lagging power factor load, i.e., they function as "pump-back" diodes when the load is inductive such as the load provided by transformer 16.

When silicon controlled rectifier 10, for example, is gated into conductivity by the positive half cycles from the external source, current flows into gate electrode 15, out of cathode 14 and through diode 46, the current flowing through diode 46 thereby actually back biasing gate electrode 36 of silicon controlled rectifier 30 and thereby insuring that silicon controlled rectifier 30 is not falsely triggered. When the polarity of transformer 16 is reversed at the time that silicon controlled rectifier 30 is gated into conductivity, the current is reversed and flows through gate electrode 36, out of cathode 34, and through diode 44 thereby back biasing silicon controlled rectifier 10.

Now considering the total circuit of FIG. 1, let it be assumed that initially a positive voltage is applied to gate electrode 15 of silicon controlled rectifier 10 to gate silicon controlled rectifier 10 into conductivity whereby the source voltage appears across primary winding 18 with terminal 17 of winding 18 being the positive terminal. This action in turn induces a voltage in secondary winding 22 of transformer 16 in such polarity (as shown by the designating polarity dot) as to regeneratively gate silicon controlled rectifier 10 into conductivity. While silicon controlled rectifier 10 conducts, the voltage at the cathode of Zener reference diode 44, i.e., point 39 is clamped to the value of the breakdown action of diode 44. For example, if diode 44 is an 11 volt Zener diode, point 39 is 11 volts positive with respect to ground. The current out of cathode 14 also flows through reference diode 46 to the non-polarity dot terminal of secondary winding 22. As the forward drop across reference diode 46 may be about one volt, at this time, junction 41 is at a voltage of about minus one volt with respect to ground whereby there is a net difference of about twelve volts between junctions 39 and 41. When silicon controlled rectifier 30 conducts, the same situation obtains with junctions 41 being at plus eleven volts and junction 39 being at minus one volt whereby there is twelve volts between junctions 41 and 39 and in the opposite polarity.

With silicon controlled rectifier 10 conducting, current now flows from the polarity dot terminal of winding 22 through resistor 40, saturable reactor 48 and resistor 50 to the negative (non-polarity dot) terminal of secondary winding 24. The voltage applied to saturable reactor 48 is accordingly the regulated voltage between junctions 39 and 41, for example, the aforesaid twelve volts plus the voltage of secondary winding 24 minus the voltage drop across resistor 50. The drop across resistor 50 can be made negligible by proper choice of circuit values.

If it is assumed that at the instant that silicon controlled rectifier 10 is gated into conductivity, the flux state in reactor 48 is one of negative saturation, say −B, the voltage applied to it drives it toward +B saturation. Only the small value of the exciting current flows through the loop comprising reactor 48, resistor 50, secondary windings 24 and 22 and resistor 40. Such exciting current flows in this loop until reactor 48 saturates a fixed number of volt-seconds later as determined by the volt-second characteristic of its core material and the voltage applied thereto.

The saturation of reactor 48 causes a sharp increase in the current of the loop and the voltage at point 41 is rapidly driven in the positive direction since secondary winding 22 and resistor 40 present a high impedance to current flow. Consequently, point 41 rapidly attains a voltage high enough to gate silicon controlled rectifier 30 into conductivity and to break down diode 46 whereby current now flows from point 41 to ground through diode 46. Consequently, current flows through diode 44 in the forward direction and the potential between points 41 and 39 becomes the breakdown voltage of diode 46 plus the forward drop across diode 44, i.e., the same as when silicon controlled rectifier 10 conducts but in the opposite polarity. Substantially simultaneously, the voltage of source 8 appears across primary winding 20 and by autotransformer action, terminals 19 and 21 of primary windings 18 and 20 respectively and terminals 25 and 23 of secondary windings 24 and 22 respectively become the positive terminals thereof. Accordingly, secondary winding 22 regeneratively gates silicon controlled rectifier 30 into conduction and twice the source voltage appears across capacitor 52 in the reverse polarity.

Silicon controlled rectifier 30 now conducts to provide the next half cycle of output of the inverter, the output being taken across a secondary winding of transformer 16 (not shown). The current flows at this time in the saturable reactor loop from terminal 25 of secondary winding 24 to its negative terminal through resistor 50, saturable reactor 48, resistor 40 and secondary winding 22. At the time that reactor 48 now saturates in the negative direction, junction 39 goes abruptly positive and the same events ensue to produce the next half cycle of output from the inverter.

In inverter circuits employing silicon controlled rectifiers wherein the output is developed across an inductive load, i.e., a load with a lagging power factor, at least the first 90 degrees of a half cycle of an output of a square wave gating source is required to prevent a silicon controlled rectifier that has just been gated into conductivity from ceasing to conduct. Such ceasing could occur during the "pump-back" interval when the silicon controlled rectifier that has been gated into conductivity is actually reverse biased by the "pump-back" current.

In the circuit of FIG. 1, since the length of a gating signal is co-extensive with the time that it takes reactor 48 to saturate as commutation from one silicon controlled rectifier to the other substantially occurs when saturation of reactor 48 takes place, effectively the gating signals are 180° in length, i.e., full half cycle gating signals and the silicon controlled rectifier which has been gated into conductivity does not cease conducting during the "pump-back" interval.

Diodes 56 and 60 and inductors 54 and 58 comprise part of the commutation circuit. Thus, if the situation is assumed, as shown in FIG. 1, wherein silicon controlled rectifier 10 has been conducting wherein capacitor 52 is charged with the polarity as shown, when gate electrode 36 of silicon controlled rectifier 30 receives a gating pulse at the next half cycle, capacitor 52 discharges through silicon controlled rectifier 30, inductor 54 and diode 56, the discharge of capacitor 52 being controlled by the resonance of capacitor 52 and inductor 54. If the effects of load are ignored, the commutation or reverse voltage supplied to silicon controlled rectifier 10 would be one fourth of the resonant period of the LC combination comprising capacitor 52 and inductor 54, i.e., the first 90° of the resonating cycle. The same situation obtains with regard to capacitor 52 and inductor 58 when silicon controlled rectifier 10 is gated into conductivity at the next half cycle. Inductors 54 and 58 and diodes 56 and 60 also constitute "pump-back" paths for lagging power factor loads as has been explained hereinabove.

The self-saturating magnetic amplifier, i.e., the "amplistat" of FIG. 2 can be used in the circuit of FIG. 1 in place of saturable reactor 48. In such situation as has been stated above, junction 61 of the amplistat would be connected to junction 49 and junction 69 of the amplistat would be connected to junction 39. When the amplistat of FIG. 2 would be utilized as the device which determines the frequency of the output of the inverter of FIG. 1, i.e., the "volt-second gate" thereof, D.C. source 71 connected in series with resistor 67 and with control winding 70 could be varied, such varying determining the time of saturation of the amplistat and, accordingly, determining the frequency of the output of the inverter.

In the event that it is desired to provide constant frequency output from the circuit from FIG. 1, the A.C. clamp of FIG. 3 would be utilized by connecting junction 79 of the clamp to junction 49 and junction 75 of the clamp to junction 41 thereby insuring that a constant voltage is applied to the volt-second gate whereby a constant saturation period is produced therefrom.

In the operation of the A.C. voltage clamp of FIG. 3, if it is assumed that junction 39 is positive with respect to junction 41, then junction 73 substantially assumes the potential of junction 79 and junction 77 assumes the potential of junction 75, diode 80 providing constant voltage between junctions 73 and 77. When junction 75 is positive with respect to junction 79, junction 73 assumes the potential of junction 75 and junction 77 assumes the potential of junction 79. Here again, the voltage between junction 73 and 77 is clamped to the value of the breakdown voltage of diode 80.

The self-oscillating inverter of this invention requires that initially a gate electrode of one of the silicon controlled rectifiers be gated into conductivity by being pulsed with a positive voltage or that the anode to cathode path of one of the silicon controlled rectifiers be momentarily shorted whereby the silicon controlled rectifier is switched into conductivity by regenerative gating, i.e., the transformer action occurring in secondary winding 22. After such initiation of conduction, the means for starting the inverter does not interfere with its normal self-oscillating action. Such starting could accordingly be effected by a relay circuit (not shown) for example, which upon being actuated shorts the anode to cathode path of a silicon controlled rectifier or by a push button switch, etc.

Figure 4:
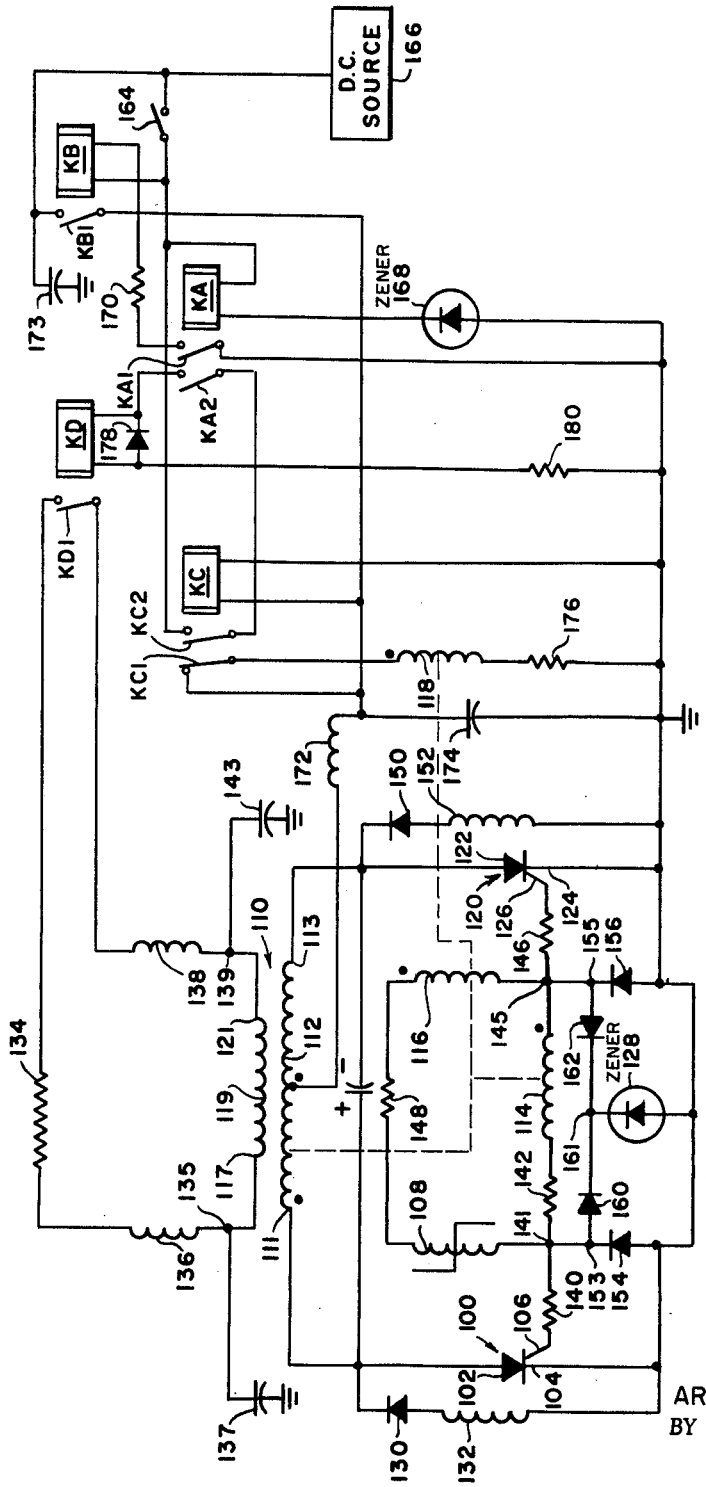
FIG. 4 is a schematic depiction of another embodiment of a self-oscillating static inverter in accordance with the principles of the invention.

In FIG. 4 there is shown an arrangement comprising a self-oscillating inverter in accordance with the principles of this invention, the arrangement including a starting circuit for the inverter.

In the arrangement, the inverter includes silicon controlled rectifiers 100 and 120, the anode 102 of silicon controlled rectifier 100 being connected to a terminal 111 of the primary winding 112 of the output transformer 110, the anode 122 of silicon controlled rectifier 120 being connected to the other terminal 113 of primary winding 112. The cathodes 104 and 124 of silicon controlled rectifiers 100 and 120 are both connected to ground.

Connected between the anode and cathode of silicon controlled rectifier 100 is the series arrangement of the cathode to anode path of a diode 130 and an inductor 132 and connected between the anode and cathode of silicon controlled rectifier 120 is the cathode to anode path of a diode 150 and an inductor 152. The gate electrodes 106 and 126 of silicon controlled rectifiers 100 and 120 are interconnected by the series arrangement of a resistor 140, a resistor 142, secondary winding 114 of transformer 110 and a resistor 146. Connected between the junction 141 of resistors 140 and 142 and the junction 145 of secondary winding 114 and resistor 146 is the series arrangement of a saturable reactor 108, a resistor 148 and secondary winding 116 of transformer 110.

Junction 141 is connected to ground through the cathode to anode path of a diode 154 and junction 145 is connected to ground through the cathode to anode path of a diode 156. Connected between the junction 153 of the cathode of diode 154 and junction 141, and the junction 155 of the cathode of diode 156 and junction 145 is a series arrangement of the anode to cathode path of a diode 160 and the cathode to anode path of a diode 162, the junction 161 of the cathodes of diodes 160 and 162 being connected to ground through the cathode to anode path of a reference diode 128, reference diode 128 suitably being a Zener diode.

A secondary winding 119 of transformer 110 is in circuit arrangement with a load which is schematically depicted as a resistor 134. An inductor 136 is included between terminal 117 of winding 119 and load 134 and the series arrangement of an inductor 138 and the normally open contacts KD1 of a relay KD are connected between terminal 121 of secondary winding 119 and load 134. The junction 135 of inductor 136 and terminal 117 is grounded through a capacitor 137 and the junction 139 of terminal 121 and inductor 138 is grounded through a capacitor 143.

The operation of the circuit of FIG. 4 as described thus far is substantially similar to the operation of the circuit of FIG. 1. However, the use of diodes 154, 156, 160 and 162 enables the elimination of one of the Zener diodes of the circuit of FIG. 1. Thus, it is seen that the voltage difference between junctions 141 and 145, when, for example, silicon controlled rectifier 100 is conductive, is the forward drop across diode 160, the breakdown voltage of diode 128 and the forward drop across diode 156. When silicon controlled rectifier 120 is conductive, the voltage difference between points 145 and 141 in the opposite polarity is the forward drop across diode 162, the breakdown voltage of diode 128, and the forward drop across diode 154. Therefore, when silicon controlled rectifier 100 is conductive, diode 162 serves as a decoupling diode between points 161 and 155 and when silicon controlled rectifier 120 is conductive, diode 160 serves as a decoupling diode between points 161 and 153, points 153 and 155 being the same as points 141 and 145 respectively. Diodes 154 and 156, of course, function as blocking diodes when silicon controlled rectifiers 100 and 120 are respectively conductive.

The circuit of FIG. 4 also includes a start-up circuit to eliminate the need for any outside gating source for initially effecting the operation of the self-oscillating inverter. In the operation of the start-up arrangement, upon the closing of switch 164, a circuit is completed to ground from D.C. source 166 through closed switch 164 and the series arrangement of the operating coil of a relay KA and a reference diode 168, diode 168 suitably being a Zener diode and serving to regulate the voltage applied to relay KA. With the consequent energization of relay KA, normally open contacts KA1 associated therewith assume the closed position whereby a circuit can now be completed from source 166 to ground through closed switch 164, the operating coil of a relay KB, a resistor 170 and the now closed contacts KA1.

The energization of relay KB effects the closing of normally open contacts KB1 associated therewith whereby potential from source 166 is applied to the mid-point of primary winding 112 through the series arrangement of closed contacts KB1 and inductor 172, inductor 172 and capacitors 173 and 174 providing a low pass filter. Also, simultaneously with the closing of relay contacts KB1, a circuit is completed to ground from source 166 through closed contacts KB1, and the operating coil of a relay KC and from source 166 through closed contacts KB1 and the series arrangement of normally closed contacts KC1 associated with relay KC, a secondary winding 118 of transformer 110 and a resistor 176. Since current is supplied through secondary winding 118 and accordingly, appears in secondary winding 114 by transformer action at the same time that primary winding 112 is connected to source 166 through closed contacts KB1, the operation of the inverter is initiated since silicon controlled rectifier 120 is gated into conductivity, the latter resulting from the polarity chosen for secondary winding 114.

With relay KC in the energized state, a circuit can be completed to ground through the series arrangement of now closed contacts KC2 associated with relay KC and now closed contacts KA2 associated with relay KA, the parallel combination of the operating coil of relay KD and the cathode to anode path of a transient suppression diode 178 and a resistor 180 whereby relay KD is energized. At the same time normally closed contacts KC1 open to remove winding 118 from circuit. The energization of relay KD causes normally open contacts KD1 associated therewith to close whereby load 134 is connected in circuit with secondary winding 119 of transformer 110.

From the above, it is seen that the supplying of current to secondary winding 118 initiates the operation of the static inverter. The sequence of events in the starting arrangement are first, the energization of relay KA, next the energization of relay KB to initiate operation of the inverter, third the energization of relay KC and the opening of contacts KC1 to remove secondary winding 118 from circuit and fourth the energization of relay KD.

Thus, the time between the initiation of operation of the inverter and the connecting of load 134 into circuit with secondary winding 119 is substantially equal to the sum of the respective periods of energization required for relay KC and relay KD.

The respective combinations of inductor 136 and capacitor 137 and inductor 138 and capacitor 143 provide radio frequency noise filters.

Accordingly, with the start-up circuit of FIG. 4, there is provided an arrangement whereby the operation of the inverter is initiated prior to the picking up of the load and consequently the starting of the inverter is always assured.

While there have been described what are considered to be the preferred embodiments of this invention, it will be obvious to those skilled in the art that various changes and modifications may be made therein without departing from the invention, and it is, therefore, aimed in the appended claims to cover all such changes and modifications as fall within the scope of the invention.

What is claimed as new and desired to be secured by Letters Patent of the United States is:

1. A circuit for converting D.C. power from a source to A.C. power comprising first and second gate controlled rectifiers connected in parallel across the source, each gate controlled rectifier having first and second power terminals and each having a gate terminal, means for connecting said first and second power terminals across the source, a commutating capacitor connected between said first power terminals of said gate controlled rectifiers, means coupled to said power terminals and to said gate terminals of said gate controlled rectifiers and including a first current path between said gate terminals for developing a potential between said gate terminals of one polarity when said first gate controlled rectifier is conductive and of the opposite polarity when said second gate controlled rectifier is conductive, and a second current path connected between said gate terminals and including a saturable means, the saturation of said saturable means causing said potential to change polarity to switch conduction from the conductive gate controlled rectifier to the nonconductive gate controlled rectifier.

2. A circuit for converting D.C. power from a source having a positive and a negative terminal to A.C. power comprising first and second gate controlled rectifiers connected in parallel across the source, each of said gate controlled rectifiers comprising an anode, a cathode, and a gate electrode, means coupling said anode to said positive terminal, means coupling said cathode to said negative terminal, a commutating capacitor connected between said anodes of said gate controlled rectifiers, means coupled to said anodes and cathodes and gate electrodes including a first current path connected between said gate electrodes for developing a potential between said gate electrodes of one polarity when said first gate controlled rectifier is conductive and of the opposite polarity when said second gate controlled rectifier is conductive, and a second current path connected between said gate electrodes including saturable means, the saturation of said saturable means causing said potential to change polarity to switch conduction from the conductive gate controlled rectifier to the nonconductive gate controlled rectifier.

3. A circuit for converting D.C. power from a source having a positive and a negative terminal to A.C. power comprising first and second gate controlled rectifiers connected in parallel across the source, each of said gate controlled rectifiers comprising an anode, a cathode, and a gate electrode, means coupling said anode to said positive terminal, means coupling said cathode to said negative terminal, means coupled to said gate electrodes for developing a potential between said gate electrodes of one polarity when one of said gate controlled rectifiers is conductive and of the opposite polarity when the other of said gate controlled rectifiers is conductive, said potential developing means comprising first and second like voltage regulating devices, said first device being connected between said first gate electrode and said negative terminal, said second device being connected between said second gate electrode and said negative terminal, an impedance means coupled between said gate electrodes and to said positive terminal for developing said potential, saturable means coupled between said gate electrodes, the saturation of said saturable means causing said potential to change polarity to switch conduction from the conductive gate controlled rectifier to the nonconductive gate controlled rectifier, and a capacitance connected between said anodes of said controlled rectifiers to commutate into nonconductivity said conductive gate controlled rectifier when the polarity changes.

4. A circuit as defined in claim 3 wherein said devices comprise first and second breakdown diodes, each having its cathode to anode path coupled between a gate electrode and said negative terminal whereby the potential is the sum of the breakdown voltage of the diode connected to the gate electrode of the conductive gate controlled rectifier and the forward voltage drop of the diode connected to the gate electrode of the other gate controlled rectifier.

5. A circuit for converting D.C. power from a source having a positive and a negative terminal to A.C. power comprising first and second gate controlled rectifiers, each comprising an anode adapted to be connected to said positive terminal, a cathode adapted to be connected to said negative terminal, and a gate electrode, a transformer comprising first and second primary windings connected between said positive terminal and said first and second anodes respectively and first and second similarly poled secondary windings, a commutating capacitor connected across said first and second primary windings, a first breakdown diode connected in its cathode to anode path between said first gate electrode and said negative terminal, a second breakdown diode connected in its cathode to anode path between said second gate electrode and said negative terminal, said first secondary winding being in series circuit arrangement with said gate electrodes, the occurring of conduction in one of said gate controlled rectifiers causing power from said source to be applied through one of said primary windings to said conducting gate controlled rectifier, said first secondary winding being poled so as to regeneratively gate into conductivity said conducting gate controlled rectifier, there being developed between said gate electrodes a potential which is the sum of the breakdown voltage of said diode connected between the gate electrode of said conducting gate controlled rectifier and said negative terminal and the forward voltage of said other diode, a series arrangement of saturable means and said second secondary winding connected between said gate electrodes, the saturation of said saturable means causing said potential to change polarity to switch conduction from the conductive to the nonconductive gate controlled rectifier.

6. A circuit as defined in claim 5 and further including a first series arrangement of a first inductor and a first diode connected between said first cathode and said first anode and a second series arrangement of a second inductor and a second diode connected between said second cathode and said second anode, each of said diodes being poled to conduct current from the cathode to which it is connected to the anode to which it is connected.

7. A circuit as defined in claim 6 wherein said first and second secondary windings are connected to one of said gate electrodes, said saturable means is connected at one of its terminals to the other gate electrode and further including means connected between said one gate electrode and the other terminal of said saturable means for clamping the A.C. voltage between said one gate electrode and said other terminal to a chosen value.

8. A circuit as defined in claim 7 wherein said saturable means comprises a saturable reactor.

9. A circuit as defined in claim 7 wherein said saturable means comprises a self-saturating magnetic amplifier.

10. A circuit for converting D.C. power from a source having a positive and a negative terminal to A.C. power comprising first and second gate controlled rectifiers, each comprising an anode adapted to be coupled to said positive terminal, a cathode adapted to be connected to said negative terminal, and a gate electrode, a transformer comprising first and second primary windings connected between said positive terminal and said first and second anodes respectively and first and second similarly poled secondary windings, a commutating capacitor connected across said primary windings, a breakdown diode having its anode connected to said negative terminal, mutually exclusive coupling means for individually coupling the cathode of said breakdown diode to each of said gate electrodes, said first secondary winding being in series circuit arrangement with said gate electrodes, the occurring of conduction in one of said gate controlled rectifiers causing power from said source to be applied through one of said primary windings to said conducting gate controlled rectifier, said first secondary winding being poled so as to regeneratively gate into conductivity said conducting gate controlled rectifier, there being developed between said gate electrodes a potential which is the sum of the breakdown voltage of said breakdown diode and a voltage determined by said coupling means, a series arrangement of saturable means and said second secondary winding connected between said gate electrodes, the saturation of said saturable means causing said voltage to change polarity to switch conduction from the conductive to the nonconductive gate controlled rectifier.

11. A circuit as defined in claim 10 wherein said coupling means comprise first and second diodes respectively connected in their anode to cathode paths between said negative terminal and a gate electrode, and third and fourth diodes connected between the cathode of said breakdown diode and said gate electrodes respectively, said third and fourth diodes being reverse poled with respect to said last named cathode.

12. A circuit as defined in claim 11 wherein said saturable means comprises a saturable reactor.

13. A circuit as defined in claim 11 wherein said saturable means comprises a magnetic amplifier.

14. A circuit as defined in claim 11 and further including clamping means coupled to said series arrangement for regulating the voltage applied to said saturable means.

References Cited by the Examiner
UNITED STATES PATENTS 3,034,015 5/1962 Schultz.
3,151,287 9/1964 Pintell _____ 321—2 X ROY LAKE, *Primary Examiner.*

JOHN KOMINSKI, *Examiner.*